US012478883B2

(12) United States Patent
Jaio et al.

(10) Patent No.: US 12,478,883 B2
(45) Date of Patent: Nov. 25, 2025

(54) INTERACTIVE GAMEPLAY SYSTEM WITH PLAY AUGMENTED BY PLAYER-SELECTED CUSTOMIZATION PREFERENCES

(71) Applicant: DISNEY ENTERPRISES, INC., Burbank, CA (US)

(72) Inventors: Christina Jaio, Santa Clarita, CA (US); Bob Hickman, Simi Valley, CA (US); Brent D. Strong, Newhall, CA (US); Jeffrey L. Elbert, Los Angeles, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 18/600,646

(22) Filed: Mar. 8, 2024

(65) Prior Publication Data

US 2024/0207742 A1 Jun. 27, 2024

Related U.S. Application Data

(63) Continuation of application No. 17/830,054, filed on Jun. 1, 2022, now Pat. No. 11,925,870.

(51) Int. Cl.

| | |
|---|---|
| ***A63F 13/212*** | (2014.01) |
| ***A63F 13/2145*** | (2014.01) |
| ***A63F 13/235*** | (2014.01) |
| ***A63F 13/79*** | (2014.01) |

(52) U.S. Cl.

CPC ............ *A63F 13/79* (2014.09); *A63F 13/212* (2014.09); *A63F 13/2145* (2014.09); *A63F 13/235* (2014.09)

(58) Field of Classification Search

None

See application file for complete search history.

(56) References Cited

U.S. PATENT DOCUMENTS

| | | | | |
|---|---|---|---|---|
| 11,925,870 | B2 * | 3/2024 | Jaio | A63F 13/212 |
| 2013/0045804 | A1 * | 2/2013 | Ruke | A63F 13/79 463/40 |
| 2019/0201806 | A1 * | 7/2019 | Weston | A63G 31/16 |
| 2022/0101684 | A1 | 3/2022 | Puglisi et al. | |
| 2023/0196834 | A1 | 6/2023 | Agrawal et al. | |

* cited by examiner

*Primary Examiner* — Damon J Pierce

(74) *Attorney, Agent, or Firm* — Foley & Lardner LLP

(57) ABSTRACT

A system for providing user-driven customization and enhanced personalization of interactive experiences. The system includes data storage for storing player profiles, with each including customization preferences useful in enhancing or generating one of the interactive experiences. The system includes a gameplay space adapted to provide an interactive experience, which includes one or more interactive elements. The system includes a gameplay device configured to be worn or carried by a player. A detection device detects a presence of the player in the gameplay space and obtains a unique identifier for the gameplay device. The system includes a controller retrieving a set of the customization preferences in one of the player profiles associated with the identifier. During system operations, the interactive experience is provided to the player with interactive elements generated based on the retrieved set of customization preferences, whereby the player can affect and enhance their interactive experience in real time.

20 Claims, 4 Drawing Sheets

INTERACTIVE GAMEPLAY SYSTEM WITH PLAY AUGMENTED BY PLAYER-SELECTED CUSTOMIZATION PREFERENCES

RELATED APPLICATION

This application is a continuation of U.S. patent application Ser. No. 17/830,054, entitled "INTERACTIVE GAMEPLAY SYSTEM WITH PLAY AUGMENTED BY PLAYER-SELECTED CUSTOMIZATION PREFERENCES," filed Jun. 1, 2022, which is incorporated herein by reference in its entirety.

BACKGROUND

1. Field of the Description

The present description relates, in general, to augmented reality (AR), virtual reality (VR), mixed reality (MR), extended reality (XR), and other gameplay systems and experiences configured for interactive gameplay or experiences for one or more players or participants. More particularly, the present description relates to a gameplay (or interactive) system configured to provide augmented or modified gameplay and/or interactive experiences based upon interactive or gameplay preferences (i.e., gameplay values, parameters, settings, and other data used to provide and control the interactive experience or environment that may be labeled "customization preferences"), which can be customized (e.g., modified, selected, and the like) by the participant or player.

2. Relevant Background

There are numerous situations where it is desirable to provide participants with unique interactive experiences. For example, theme and amusement parks and other large venues continue to strive to entertain visitors in a way that allows them to participate in the experience. This may involve providing interactivity such that they can modify or affect the produced experience. In particular applications, a ride or space may include gameplay that is interactive with the system being adapted to sense visitor input and to respond by changing audio outputs, visual displays, and the like. In themed lands or spaces, cast members may interact with each visitor (or player or participant) based on information known about that specific visitor.

To date, though, it has been difficult to provide interactive experiences on rides and other settings with a larger number of participants that are individualized so that each participant can immediately recognize that actions they have taken individually has changed gameplay or the experience. Instead, each participant may feel that their interactions are being lost in the noise of the group or crowd. In some cases, this issue is addressed by providing special effects such as imagery in an AR setting, for example, that seems to be produced or modified by each individual participant (e.g., each rider in a theme park vehicle). This is desirable to enhance the feeling that each participant is interacting and affecting the experience as they see the results of their interactions or user inputs. However, to date, all participants are treated similarly with their inputs being processed in a common manner, and it is now desirable to create interactive systems adapted to allow each participant to create an interactive experience that is more unique to them and, in some cases, that they can alter over time such as each time they ride a theme park ride.

Further, many theme park attractions do not offer participants much in the way of variability, and an attraction can be perceived as repetitive, which can reduce the desire of a participant to return and experience an attraction again. To some park visitors, non-interactive or predictable low-interactivity attractions can be particularly less interesting as they do not provide any material agency or personalization. Hence, there remains a desire to provide park attractions and visitor (or player) experiences that provide the visitor with some greater level of control to personalize and interact with the ride system or other interactive system or environment.

SUMMARY

To address the above and other issues, the inventors designed a system for gameplay (or a gameplay system) that can be used to provide an interactive attraction or ride for use in theme or amusement parks and other environments. The gameplay system and corresponding method solves some of the above problems and can act to drive park visitors or players to experience and re-experience park attractions such as rides, themed lands or spaces, and the like with a renewed freshness due to the enhanced interactiveness of such attractions provided by the gameplay system including different creative and interactive options and surprises to explore. The new gameplay system is configured to provide each park visitor or game player or participant with a greater feeling of control and involvement in creating the interactive experience.

The gameplay system can be thought of as a player or visitor-driven experience customizer, with customization settings or preferences that can be changed per scene of an attraction (or even on a more granular level in some cases). In some cases, the customization settings or preferences are used on a less granular level. For example, a player may specify whether they prefer heroes or villains, and this may be interpretable by the system or an attraction/experience in a broader context, e.g., sorting the player into a team or cohort that benefits from the hero or villain setting or preference. The gameplay system is configured such that each player has a centralized player (or participant) profile that is used to store customization preferences (or gameplay/interactivity values or parameters), and the gameplay system uses all or, more typically, a subset of these customization preferences to provide each interactive experience (such as within a portion of a park ride, within a space in a themed land with interactive devices (e.g., robots) and/or human actors or characters, and so on). For example, a player may be able to customize their preferences to change the virtual projectiles displayed in a shooting experience from one scene to the next or even in the midst of experiencing a scene. In another example, a player may change their preferences to select which musical instrument they are playing or conducting virtually in an interactive experience. In still another useful example, a player may change their team loyalty or affinity during or immediately before a new scene of a park ride or new space within a themed land by changing one or more of their customizable parameters in their centralized player profile.

The new gameplay system is adapted to combine a gameplay device or object (sometimes labeled "a player wearable" or "guest wearable") with an interactive experience such as a park attraction in the form of a ride, a gameplay space, a themed land, and so on. Briefly, the gameplay device is configured to be worn or held by a player (e.g., an interactive experience participant, a park visitor, and the like) and to communicate customization preferences to the player and player changes or selections of these customization preferences to a controller of the gameplay system (e.g., to a customization backend for use with a display system and so on) for use in generating an interactive experience.

A single gameplay device can be used across multiple attractions and can be thematically and contextually applied to each interactive experience provided by these attractions. In one attraction, the gameplay device can serve as a virtual weapon, a grappling hook, and a shield in response to the player's selection of the customization preferences via operations of the gameplay device to communicate user input/selections to the controller. In another attraction, the gameplay device may serve as a flashlight, a vacuum, a paintbrush, or a magic wand that can release fireworks. In still another attraction, the gameplay device is operated by the player to affiliate with a faction or team and, as a result, change the balance of the experience or a living land.

Additionally, human actors or cast members can operate a communication device to receive information about a player's customization preferences via the gameplay system and interact with the player wearing or holding the player device accordingly. Attraction creative designers can control which preferences are provided to each player via their gameplay device and how much or how little these preferences are used to change and customize what the player experiences, which, in turn, allows the attraction to start with a small implementation and add complexity over time when and where there is a desire to drive more player or participant engagement. A subset of the preferences may persist from attraction to attraction (e.g., amount of motion desired in experience, volume of audio, use of different colors, and so on) and extend out to use in themed or living lands (outside of park rides and so on) even, in some cases, to hotel and dining experiences. Additionally, the inventors recognized that not all of the participants or players are the same, and some accommodations are often required for special needs. These requirements can be fully or partially integrated into the gameplay systems by defining a subset of the customization preferences, which may include automated preferences in some cases to control the number times a player has to talk to a ride or attraction operator to provide more transparent inclusivity of diverse visitor or player needs.

More particularly, a system is described that is configured for providing user-driven interactive experiences. The system includes data storage for storing a plurality of player profiles, with each including a plurality of customization preferences useful in enhancing or generating one of the interactive experiences. The system further includes a gameplay space adapted to provide an interactive experience, which includes one or more interactive elements. For example, the system may take the form of an augmented reality system in which a player can interact and view and/or hear preference-based features or elements generated by the augmented reality system. These features or elements may be presented in the player's native language, which can be set as a customization preference in some implementations.

The system also includes a gameplay device configured to be worn or carried by a player. A detection device is in the system that is operable to detect a presence of the player in the gameplay space and, when the player is detected to be present in the gameplay space, to obtain a unique identifier for the gameplay device. The system further includes a controller retrieving a set of the plurality of customization preferences in one of the plurality of player profiles associated with the identifier. During system operations, the interactive experience is provided to the player with the one or more interactive elements being generated based on the set of the plurality of customization preferences.

In some embodiments of the system, the gameplay space includes a display system, and the one or more interactive elements include images or audio generated by the display system using the set of the plurality of customization preferences. In this or other embodiments, the controller communicates the set of the plurality of customization preferences to a communication device operable by a human cast member for use in providing the one or more interactive elements. In many cases, the set of the plurality of customization preferences is a subset (e.g., a reduced number) of the plurality of customization preferences selected based on an identifier associated with the gameplay space, an attraction in which the gameplay space is positioned, or the interactive experience itself.

The gameplay device may include a display operable to display at least one of the set of the plurality of customization preferences for viewing by the player. In such implementations, the gameplay device may include an input device configured to receive user input from the player modifying or selecting a replacement for at least one of the set of the plurality of customization preferences. Then, the modified or selected replacement for the at least one of the set of the plurality of customization preferences is communicated to the controller for use in updating the customization preferences in the player profile associated with the identifier, and the one or more interactive elements are generated based on the modified or selected replacement for the at least one of the set of the plurality of customization preferences. The modifying or selecting a replacement can be completed while the player is in the gameplay space before or during the interactive experience so as to provide real-time player input to affect the interactive experience. The gameplay device also may include a wireless communication device for communicating the user input to the detection device or the controller to provide such real-time modification of their customization preferences. The system may also include a website accessible over a communications network via a server. The website (or software generating the website) can be configured to receive user input from the player via a wireless communication device or a computing device and, in response, to modify or select one or more of the customization preferences in the player profile associated with the identifier.

The plurality of customization preferences typically will include at least one of: (a) a superhero or other character and associated abilities; (b) a visual style associated with a player; (c) a team; (d) a level of gameplay; (e) a difficulty of gameplay; (f) a request for helpers in the virtual experience; (g) one or more audio parameters; (h) a ride profile; (i) a parameter associated with game recap; (j) a parameter associated with a high-score table; (k) date related to the gameplay space; (l) a parameter associated with live or robotic entertainment in the gameplay space; (m) parameters associated with an adventure in a space within or including the gameplay space; (n) data associated with a mobile app; (o) data associated with a home video game; and (p) parameters associated with operation of a toy in toy battles.

DETAILED DESCRIPTION

Figure 1:
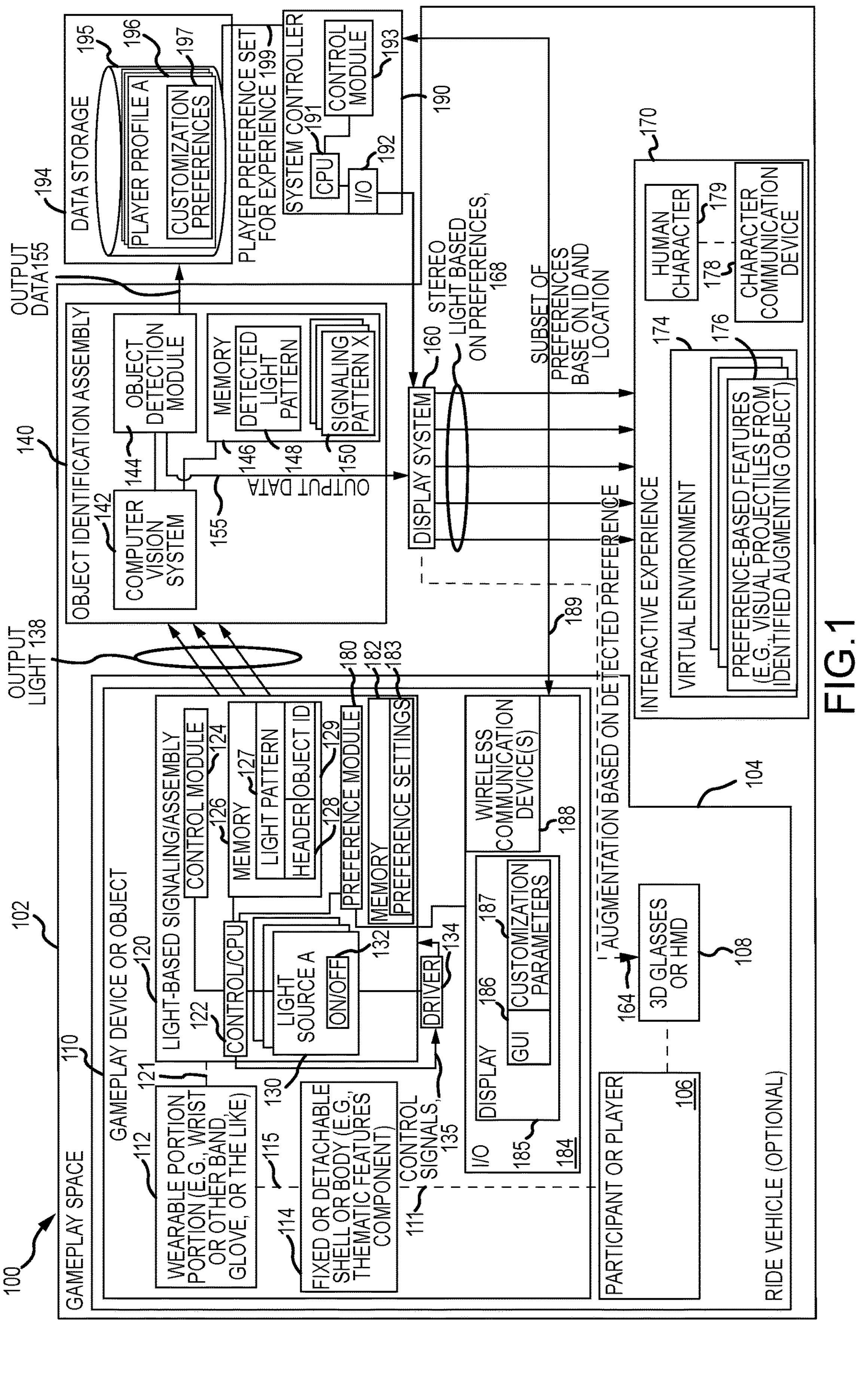
FIG. 1 is a functional block drawing of a gameplay system (or other interactive system) to provide personalized interaction for participants or players providing selection or modification of customization preferences.

Embodiments described herein are directed toward a gameplay (or other interactive) system configured to provide enhanced individualized interactivity for each player or participant. The gameplay system includes a gameplay device or object, which may be worn or held by each player or participant. The system is configured to detect the gameplay device within a space (within an attraction, a themed land, or any other space in which an interactive experience is to be provided via system operations), and the gameplay device has a unique identifier that links it to a particular player and a centralized player profile. All potential players have a centralized player profile stored in data storage (e.g., within a database in a server accessible by the system controller(s)), and each profile stores a plurality of customization preferences for use in providing an interactive experience to each player. The gameplay system operates to use the player profile in a park, an attraction within the park, a land within the park, and so on to access a subset of the preferences associated with or assigned to the particular gameplay space in which the gameplay device (and the wearing player) are located to provide a player-chosen configuration for the interactive experience.

During system operations, the player profile can be updated by the player to modify their interactive experience while at the park (or before or afterwards). The updating or selecting of customization preferences can be done in a number of ways. In one example, the player accesses a user interface displayed on a display of their gameplay device, such as a graphical user interface (GUI) that is populated with a subset of the preferences chosen by the system controller (which is in two-way wireless communications with the gameplay device) based on the present location of the gameplay device which is associated with a particular interactive experience (e.g., a space used to provide a scene in a ride or attraction, a space used to provide an themed interaction in a park land, and so on). This allows real-time (or near real-time) adjustments by the player of the interactive experience (e.g., turn the gameplay device from a laser weapon to a shield). The updating or selecting may also be completed using another communication device such as a computer adapted for wireless communication to access a network or a cellphone used to access the network, which may be used to access a website that is configured to allow a player to enter identifying and/or security data to access their player profile (which is associated with or linked to the gameplay device). Hence, the external (to the gameplay device) communication device can be used to adjust or modify all or a particular subset of the customization preferences for the gameplay device (e.g., adjust a subset for a ride in which the player is presently queued or at home or in a hotel prior to arriving at a park) to program the behavior and attributes of the gameplay device in the interactive experience ahead of time. The control components within an attraction retrieves the subset of customization parameters it needs to provide an interactive experience so as to respond to the player's preferred settings at a resolution that can be determined by the attraction (e.g., allow changes per experience, per scene, after a specific cue, and so on).

A park-wide or centralized system can be used to store the relevant data for each player and their visit. Each attraction or interactive experience facility can query the data as often as needed to provide its particular interactive experience to present the best and most up-to-date experience based on each set of player-provided/adjusted customization preferences. This data can also be used by non-attractions, such as by human actors or characters or park performers, to understand the visitor's preferences passively and implicitly. Further, meta-experience elements can be tracked and unlocked leading to even more entertaining park experiences. For example, a player can choose to be on a villain's team in an attraction and then be on a hero's team on a next visit to the attraction or on a different attraction to vary their interactive experiences.

The customization parameters may be used to control or vary an interactive experience in a wide variety of ways to implement the new gameplay system. It may be useful to provide a representative listing of gameplay attributes that can be linked to a player through the gameplay device they are wearing or holding within a gameplay or interactive space (e.g., the location and identity of the gameplay device is used to link a profile and all or subsets of customization preferences to a particular game player). The following is a non-exhaustive list of gameplay attributes that the gameplay device could be used to customize for a player or participant before or during an experience as allowed by the experience controller: (a) change your superhero or other powers; (b) change a visual style associated with a player; (c) select a team; (d) alter the level of gameplay; (e) alter difficulty of gameplay; (f) summon helpers in the experience; (g) alter the audio (e.g., volume level, language spoken, and so on); (h) alter the ride profile (e.g., intensity for more sensitive riders); (i) alter the game recap; (j) tie to the high-score table (which may include a name the player inputs on the user interface of the gameplay device); (k) tie to the land; (l) tie to the live entertainment in the land (e.g., trigger responses from robot or human actors in land); (m) adjust land-wide adventure; (n) tie to a mobile app; (o) tie to a home video game; and (p) toy versus toy battles, which may be outside park such as at home, such as with achievements in park affecting toy operations. In some cases, the gameplay device is also configured to function as an assisted listening device.

The gameplay system includes a plurality of gameplay devices or objects, such as pieces of themed merchandise, and each has associated with it an identifier, which can be used to provide a link to a player profile and their customization preferences. The gameplay system includes an object identification (or detection) assembly (or guest presence detector) configured to sense the presence of one (or more) of the gameplay devices or objects in a gameplay space and to determine the identity (or identifier) of the sensed device or object. In response, a game or system controller generates or modifies interactive features of the gameplay provided to a participant or player whose player profile is associated with the gameplay device to create a unique interactive experience for the participant.

In one particular implementation, the new gameplay system may be implemented at an amusement or theme park in one of its rides or attractions designed for interactivity (e.g., with vehicle riders). The regular gameplay experience is augmented or enhanced/modified by allowing participants such as vehicle riders to wear (or hold) gameplay devices or objects (or themed merchandise), which may be purchased onsite or offsite (e.g., online or a physical offsite store). One particular use case recognizes that characters such as superheroes often wear objects in the form of "power gauntlets" that can be activated to provide superhero-type abilities (e.g., shoot out weapons), and these power gauntlets (i.e., gameplay devices) may include a wristband or glove with a themed outer covering or body to be worn on the participants wrist or hand (and often extend over the wrist), which includes input/output (I/O) devices for communicating with a game or system controller (or the object identification assembly, in some cases) to receive preference settings for a subset of their customization preferences associated with the interactive experience to be provided in the gameplay space in which they are currently located.

In practice, participants that may be vehicle riders may be provided user-selectable interactive features or functions. For example, the participants wearing a gameplay device (e.g., a power gauntlet) will have their customization preferences for the current location and interactive experience displayed to them in a GUI on a display for their gameplay device and have the ability to modify these preferences (or the preference settings or values). In response, the game or system controller may operate the components (such as a display system) to create a player-selected interactive experience based on these customization preferences (or their settings). In one exemplary implementation, the player may experience visual types of projectiles rendered from the perspective of their wrist (or other portion of the body wear object is worn), e.g., projectiles rendered as if projected from the worn augmenting object. In some cases, the participants will also see that their projectiles, which were provided based on an identification of the gameplay device and retrieval of a player profile associated with that identification/identifier providing customization preferences, have a unique impact on the virtual projected environment or AR portion of the interactive experience that differs from other impacts associated with projectiles or other augmenting features/functionalities associated with other players and with interactions provided to those not wearing or holding any gameplay device. Stated differently, certain "powers" are given to those with the power gauntlets or gameplay devices by the gameplay system and will provide unique opportunities to affect the nearby physical or displayed scenic environment differently depending on their current customization preferences. In other cases, though, the gameplay system may extend outside a venue setting and allow the user of the gameplay device to role play at home, on a cruise ship, or other environment and, in some cases, to connect with other experiences like console and/or online games where their customization preferences defined in their player profile can also be utilized to affect interactive experiences.

The gameplay system with customization preferences is well-suited for interactive and responsive experiences. In this context, "responsive" may be an environment that is adapting/changing itself to the player's preferences, but the player may not necessarily or assertively "interact" with that environment. The gameplay system and customization preferences are configured such that the environment, or elements of the environment, are reacting and adapting to the player and their updatable preferences. Note, the player is effectively passive to them, which is different from how most people conventionally envision interactive experiences in an attraction.

The gameplay system may be considered a "super system" or a set of systems/technical ecosystems configured to allow a guest to interact through a number of interfaces. These interfaces may include, or make use of, conventional and wearable technology, gesture-based technology, and/or voice-based interfaces. The interfaces that allow individual players or park visitors to dynamically customize and enhance the context of their sensory and aesthetic experiences (or their family and friend's settings and experiences as well) in an attraction or within a park. There is a large potential for the gameplay system in terms of not only more fun, enjoyment, and entertainment in our experiences but also in terms of diversity and inclusion as the system can provide materially enhanced and increased accessibility for the differently able, for assisted listening and language preferences, and for enhanced communication, understanding, and enjoyment in a shared and immersive experience.

FIG. 1 is a functional block drawing of a gameplay system (which can mean nearly any interactive system) 100 to provide personalized or customizable interaction for participants or players 106 based on use and detection of a gameplay device or object (e.g., particular merchandise or a toy linked to the game) 110 of the present description. The system 100 includes a gameplay or interactive space 102, which in the example of a park ride or attraction may be a space along a vehicle's ride path or a space in which visitors of the park enter to participate in gameplay. As shown, a human participant or player 106 has entered the space 102, and, in a typical system 100, there would be one, two, three, or more participants 106.

The participant or player 106 may enter the space 102 on foot or may be brought into the space 102 in or on a ride vehicle 104. The participant 106 may be wearing equipment to support a 3D virtual or augmented reality (VR or AR) display system 160 providing signals 164 such as by wearing 3D glasses or an HMD 108. The signals 164 are used to provide an individualized interactive experience to the participant 106 by augmenting their interactive experience 170 in a manner based on whether or not they are wearing or holding a gameplay device 110 and based on an identification of the object 110 to provide a link to a database 195 stored in data storage 194. The database 195 includes a plurality of player profiles 196 with each associated with one of the gameplay devices 110 (or to a player 106 using a gameplay device 110), and each profile 196 includes a plurality of customization preferences 197 (e.g., settings or values for one-to-many interactive game parameters used to generate an interactive experience, with the list provide above providing some useful examples of preferences 197). In other cases, though, the participant 106 may not wear any 3D headgear 108 and be provided the interactive experience including 3D visuals unique to them and their customization preferences 197 by having the display system 160 adapted for autostereoscopic projection or display via its output light 168 providing left and right eye images for the participant 106 at their present eye locations or by communicating a player preference set for a particular experience associate with the gameplay space 102 to a human character/cast member 179 via a character communication device 178. The type of display system 160 used may vary to implement the gameplay system 100 as long as it is configured to provide audio and/or visual components that are linked to identification of the augmenting object 110 and associating it with a player profile 196 linked to the participant 106 so that the participant 106 perceives the interactive experience as being affected by their wearing or holding the gameplay device 110 and selecting the preferences 197.

In the system 100, the participant 106 is shown with dashed line 111 to be wearing or holding a gameplay device or object 110. This object 110 may take a wide variety of forms including, but not limited to, toys or clothing articles or nearly any pieces of merchandise that a participant 106 may hold or wear such as on their hands, wrists, arms, heads, or other portions of their bodies (e.g., gloves or bands for fitting over a portion of a person's hands, an item that can be held on a person's arms with a wrist or arm band, a hat, a shirt, coat, uniform, vest, or the like). As shown, the object 110 includes a base portion 112 that typically will be wearable such as a wrist, arm, or hand band configured to retain the object 110 on the body of the participant 106, and the object 110 further may include a shell or body 114 that may be fixed onto the base 112 or be detachable (both attachment types shown by dashed line 115). The shell or body 114 may take nearly any form with some embodiments using it to provide thematic features to the object 110 such as to take on the appearance of articles of clothing, tools, or weapons associated with characters from media (e.g., a superhero moving character, a character from a children's animated feature, and so on). In some of the specific examples provided herein, the object 110 with its wearable portion 112 and shell/body 114 are designed to take on the appearance of a power gauntlet, but, with this example, those skilled in the arts will readily understand that the object 110 may be nearly any item that the public associates with characters from their favorite media or characters often associated with gameplay (e.g., from role play and so on).

The system 100 includes an object identification assembly or guest preference detector 140 that is adapted to detect the presence of the gameplay device or object 110 in the space 102 (and associate it with participant 106 or this function may be done by the game or system controller 190) and to identify the detected object 110, such as with an identifier associated with the device 110 that can be used to link the device 110 to a player 106 and/or their player profile 196. The assembly 140 may be wholly or partially located onboard the vehicle 104 in some embodiments. The assembly 140 is also preferably adapted to determine where on the participant's body the object 110 is worn or otherwise located such as on which wrist or hand as this will allow the display system 160 to create visual augmentations or features 176 to the interactive experience 170 that are more realistic as they appear to emanate from or to be projected from that portion of the body or the location of the object 110 in the gameplay space 102. This may also be useful it the participant 106 is wearing or holding more than one object 110 such as one on each of their wrists, hands, or arms (and each may be associated with a different player profile (e.g., a player may establish a different profile for each of their gameplay devices) to provide two (or more) differing or matching augmentations or interactive features 176 per player 106 during operations of the system 100). The detection method implemented by the assembly 140 preferably is automatic and will not require the participant 106 to take any action (possibly other than powering on their object 110) such as a special registration or tagging to hardware of the system 100. Object detection is, in this way, more interesting and magical.

To this end, the augmenting object 110 further is shown to include a light-based signaling assembly 120 that is mounted upon or in the wearable or base portion 112 as shown with dashed line 121. Other implementations, though, provide the assembly 120 on or in the shell or body 114. The assembly 120 is adapted to generate or emit output light 138 in a manner that acts to provide a signal to the object identification assembly 140, which acts as a unique identifier that the assembly 140 can process to detect and identify the augmenting object 110 in the space 102. The assembly 120 includes a controller or processor 122 that manages operations of a control module 124 and memory (or data storage) 126. The memory 126 stores a light pattern or signal definition 127, which may take the form of a header 128 and an object identification 129. In some embodiments, the output light 138 may be a series of flashes of light timed with the sampling frequency of the assembly 140 to communicate the bits of the header 128 and the bits of the object ID 129, and the header 128 may be used to identify the presence of one of the augmenting objects 110 (e.g., to indicate presence of a power gauntlet) while the object ID 129 indicates the object 110, which can be used to access one of the player profiles 196 associated with the object 110.

The control module 124 may take the form of software and/or firmware 124 to provide the control functions described herein. The module 124 may include wireless communication devices to allow the assembly 120 to communicate with the object identification assembly 140 such as to receive a command or ping to initiate operations to provide the output light 138 (e.g., the object 110 may not provide the light signal or output 138 until interrogated by the assembly 140 in some cases). The light-based signaling assembly 120 includes one or more light sources 130 and a driver (e.g., a self-contained power supply or the like) 134, and each of the sources 130 may respond to control signals 135 from the controller 122 to provide the output light 138 in the defined light pattern 127 (i.e., to signal a header 128 and an ID 129) by alternating between on and off states 132.

In one embodiment, the light sources 130 are each light emitting diodes (LEDs) that in some cases are infrared (IR) LEDs so that the output light 138 is not visible to the participant 106 so as to make the detection and identification by the object identification assembly 140 more magical or behind-the-scenes for the participant 106. The use of two, three, or more light sources 130 operating based on the same light pattern 127 is desirable in some cases to increase the likelihood that the output light 138 is detected by the assembly 140 (e.g., is not blocked by portions of the player's body, by the vehicle 104, by other participants 106, and the like), and, typically, two or more sources 130 are used that are spaced apart some distance from each other on the base 112. The shell or body 114 is configured to allow the light 138 from sources 130 to pass such as with windows transparent or transmissive to the light 138 or by being formed of a material that allows the light 138 to be transmitted through the shell or body 114.

As shown, the object identification assembly 140 includes a computer vision system 142 that runs an object detection module 144 (e.g., software providing algorithms and/or machine learning processes). The assembly 140 further includes memory/data storage 146 storing a detected light pattern 148 from the output light 138 from the object 110 and a set of one-to-many signaling patterns 150. The object detection module 144 works to compare detected light patterns 148 with the signaling patterns 150 to identify likely matches. Each signaling pattern 150 is associated with a particular augmenting object type (e.g., a particular piece of merchandise such as a power gauntlet for a character from a movie). The computer vision system 142 may take any form now understood in the arts or to be later developed, and it basically operates to capture video images of the space 102 including the participant 106 and any augmenting object 110 present.

In some embodiments, the computer vision system 142 operates to process these images to identify the presence and location of the participant 106 and then operates with the object detection module 144 to monitor for the presence of the output light 138. The output light 138 is then processed to find a match among the patterns 150. The module 144 or another element of the assembly 140 communicates this match or output data 155 to a system controller 190, which can relay the output data with the player preference set as shown with arrow 199 to the display system and/or to the character communication device 178 for use by a cast member 179. The output data 155 may include a location of the object 110 within the space 102 (e.g., within the vehicle 104) and on or near the body of the participant 106. The output data 155 also will identify the object 110 to the display system 160. The display system 160 uses this information to generate (e.g., render) player-specific features 176 in the virtual environment 174 provided as part of the interactive experience 170 in the space 102. For example, the display system 160 may render 3D imagery (signals 164 or light 168) that produces visual projectiles 176 that appear to emanate or to be projected from the augmenting object 110, and the projectiles 176 may be rendered to suit or based on a subset 199 of the customization preferences 197 linked to the player 106 and/or the gameplay device 110 (e.g., to suit the abilities or powers selected by the player 106 by adjusting or choosing the customization preferences 197). In some embodiments, assembly 120 is configured to output RF or other wireless signals 138 (e.g., in response to a ping signal from the assembly 140 after determination of presence of player 106 in space 102) that can be received and processed by the object ID assembly 140 to determine the ID of the gameplay device 110 (or to determine another identifier such as one for the player 106) to be able to link to a particular player profile 196.

As shown, the system controller 190, which may be in the gameplay space 102, includes a processor 191 that runs I/O devices to communicate with the object identification assembly 140 to receive the output data 155, which includes the determined ID or identifier for the object 110 (or player 106). The processor 191 runs software or firmware to provide the functions of a control module 193 that include, in response to receiving the ID, to retrieve or access a player profile 196 in the data storage 194 that is linked to the ID. Further, the control module 193 typically will process the customization preferences 197 to select a subset of these preferences 197 that are associated with the gameplay space 102 and/or with the interactive experience 170, and this subset is provided as shown with arrow 199 to the display system 160 for use in generating the interactive experience 170 in a manner suited to the player's preferences. As shown with features 176 in the virtual environment 174.

Further, as shown, the gameplay device 110 includes a preference module 180, provided by the processor 122 (or another processor) running software or firmware. The module 180 manages access to memory 182 in which a plurality of preference settings 183 for all or a subset of the customization preferences 197 in the profile 196 for player 106 (or object 110). For example, the preference settings 183 may be communicated as shown at 189 by the system controller 190 and include a subset of the preferences 197 in a player profile 196 that are chosen based on the ID (of the player 106 or gameplay device 110) and also on the location of the gameplay space 102, which indicates which interactive experience 170 will be provided and which preferences 197 are relevant to creating that experience 170 by the display system 160 and/or human character 179.

The gameplay device 110 includes I/O devices 184 including a wireless communication device 188 to allow two-way communications with the system controller 190 to receive the subset of preferences 189 and also to allow user input modifying or choosing the preferences to be communicated back to the system controller 190, which responds by updating the player profile 196 with the new or modified customization preferences 197 (e.g., to switch from one superpower to another during the interactive experience or before repeating the experience such as in a next ride). The I/O devices 184 also include a display or display device 185, e.g., a touchscreen or the like, that is operated by the module 180 to display a user interface 186 that includes a plurality of customization parameters or preferences 187, which are generated based on the received subset of preferences 189 (and/or on stored preference settings 183). In this way, the user interface 186 may be more readily displayed and interacted with by the player 106 via a display 185 that may be relatively small (e.g., a touchscreen similar to those found in many handheld video games and cellphones). The I/O devices 184 include elements, such as a touchscreen, a keypad, voice control components, and the like, that allow the player 106 to enter user input to select and/or modify the displayed customization parameters 187, and the wireless communication device 188 is operated, at least periodically, by the module 180 to transmit the user-updated subset of preferences 189 to the system controller 190 for use in updating the customization preferences 197 in the player profile 196.

With an understanding of the system 100 in hand, one skilled in the art will readily recognize that the discussed implementation of system 100 and its components provide useful ways to implement the customization preferences described herein, but the description and accompanying claims are not limited to this exemplary system. For example, the system 100 is shown to use a light-based signaling assembly 120 for communications. However, many other technologies may be used including tracking technologies, optical communication systems, wireless communication devices and systems, and the like.

Figure 2:
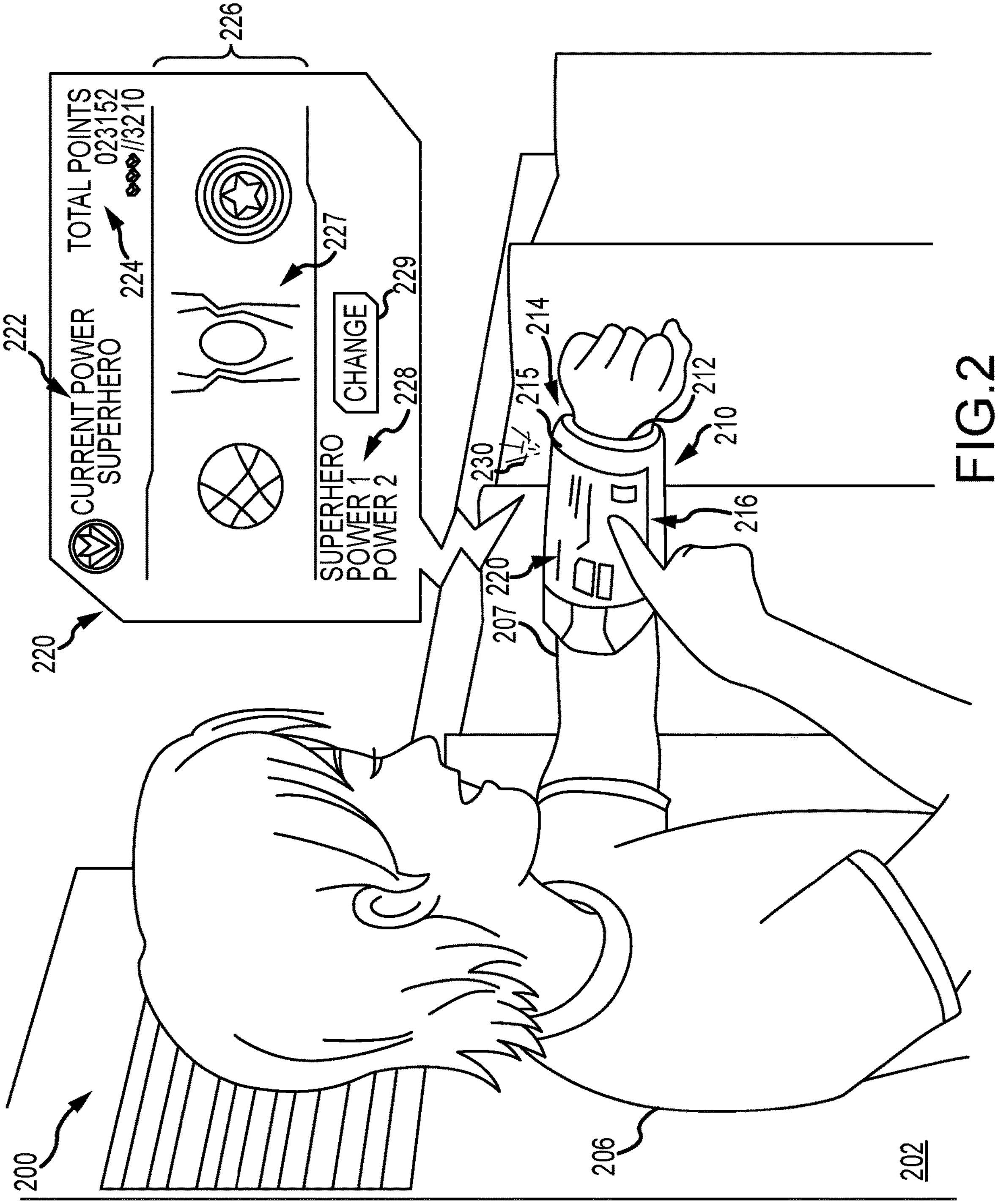
FIG. 2 illustrates an exemplary gameplay system during exemplary use in a gameplay space.

FIG. 2 illustrates an exemplary gameplay system 200 during exemplary use in a gameplay space 202. As shown, a participant or player 206 has entered the gameplay space 202, and, as discussed with reference to FIG. 1, a guest presence detector would operate in the system 200 to detect the player's presence. The player 206 is shown to be wearing on their arm/wrist 207 a gameplay device 210, which may be an exemplary implementation of the device 110 of FIG. 1. The gameplay device 210 includes a wearable portion 212 over which is provided a fixed or detachable shell or body 214. On an outer surface 215 of the shell/body 214, the gameplay device 210 includes a display or display element 216, e.g., a touchscreen, a monitor, or the like. Further, the display 220 (or another portion of the device 210) includes a speaker (not shown) that is operable to output, as shown with lines 230, audio output as part of an interactive experience.

The display 210 is operated, by hardware and software as discussed for device 110 in FIG. 1, to generate and display an interactivity GUI 220 (which is shown enlarged as well as on display 216 as would be viewed by the player 206). The display 216 is configured to allow the player 206 to provide user input, e.g., selections or modifications of their customization preferences as is shown in FIG. 2. To this end, the display 216 may take the form of a touchscreen or include a touch pad, keyboard, or voice activation/input device(s).

The interactivity GUI 220 may be configured to display game data or information such as a player's total points, remaining lives, and so on as shown at 224. Further, though, the GUI 220 is used to display information useful to allow a player 206 to know a subset of their customization preferences that are relevant to the interactive experience provided in the gameplay space 202 by system 200 and to modify these existing preferences or switch to different available customization preferences. In this example, the interactivity GUI 220 displays as shown in region 222 information for a first customization preference (e.g., a present superhero/character selection for creating the interactive experience with its powers or capabilities and team alliances). The GUI also includes a second area or region 226 in which icons or buttons 227 are displayed of alternative customization preferences that can be selected by the player 206 to replace the first customization preference 222.

In region or space 228 of the GUI 220, data associated with the alternative customization preferences 226 can be displayed. In the illustrated example, the icon 227 is highlighted or selected by the player 206 via user input to the GUI 220 (e.g., a swipe of a touchscreen in region 226), and the data/information related to the icon 227 is displayed including the name of the alternative superhero and their powers/abilities. A button 229 can be provided for the player 206 to select or change to the new or differing customization preference represented by icon 227 and as partially defined by data 228 (e.g., switch from Superhero X to Superhero Y). This change or updating of the first interactive preference 222 may be made before an interactive experience (outside the gameplay space 202 or within the space 202) or during the interactive experience while in the gameplay space 202. For example, the player 206 may decide that the powers associated with a second superhero/character would be more desirable in the interactive experience in gameplay space 202 (e.g., want a defensive tool versus an offensive weapon or vice versa to succeed in the gameplay space 202 or in the present interactive experience in which they are participating). Hence, a unique aspect of the gameplay system 200 is that the player 206 can view a subset of their customization preferences relative to the present gameplay space 202 and/or interactive experience in which they are participating in real-time (during the interactive experience) and modify or change one or more of these customization preferences in real-time.

Figure 3:
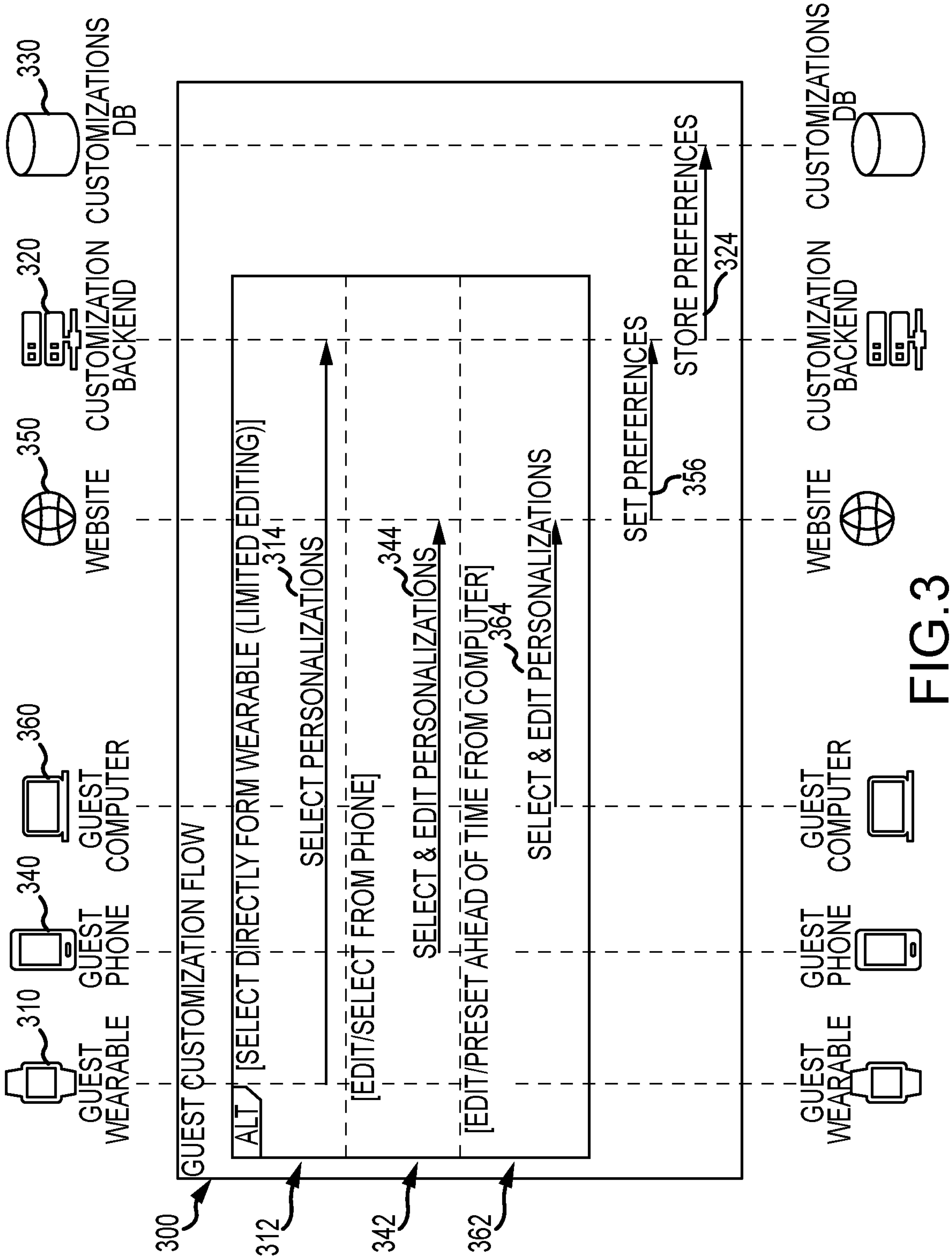
FIG. 3 illustrates a flow diagram showing steps in a process for player or participant (or guest/visitor) driven enhancement of an interactive experience, such as provided in a theme park ride or attraction or a themed land, through customization of one or more customization preferences (which may be labeled "personalizations" herein)

FIG. 3 illustrates a flow diagram showing steps in a process 300 for player or participant (or guest/visitor) driven enhancement of an interactive experience, such as provided in a theme park ride or attraction or a themed land, through customization of one or more customization preferences (which may be labeled "personalizations" herein as shown in FIG. 3). As shown, the participant, player, or guest/visitor (not shown but understood from FIGS. 1 and 2) may operate a wearable gameplay device 310 to access and modify their customization preferences. Alternatively, the player may operate other communication devices to access a communication network to access their centralized player profile and set and modify their customization preferences such as by accessing a customization website 350. As shown, the communication devices may take the form of a cellphone or similar handheld device 340 adapted for wireless communications or a computing device or computer 360 (e.g., a laptop, a desktop, a pad, a notebook, or other computing device adapted for wireless (e.g., Wi-Fi) communication). A gameplay system may include a customization backend (e.g. a server running control software or the like to provide the system controller 190 in FIG. 1) as well as data storage/memory devices to store a customizations database 330 in which a plurality of player profiles are stored each with a set of customization preferences/personalizations linked by one or more identifiers to a particular player (and/or gameplay device 310).

The method 300 provides several ways in which a player may set, store, and customize their preferences. Again, these preferences may be used for general purposes such as special accommodation preferences, favorite characters choices, and so on, for themed lands such as to show a preference for a team or faction, and for a specific attraction and its interactive experience, which may involve choosing which character to be in the gameplay (or which powers or abilities to have in the gameplay). In a first access/customization approach 312, a player operates their wearable or gameplay device 310 to select personalizations (e.g., review and edit customization preferences in a profile in the database 330). As shown, the wearable 310 is communicatively linked to the customization backend 320, which feeds a subset of the customization preferences to the wearable 310 for use in generating a GUI with all or some of the subset of preferences for review and editing by the player as shown at 314. In response, the customization backend 320 acts to update and store the preferences as shown at 324 in the database 330. The device 310 is typically used to access a more limited selection of the preferences so as to ensure a more intuitive and simple preference selection flow. In some cases, the wearable 310 instead communicates with the gameplay system via a guest presence detector to update their preferences.

In the second and third access/customization approaches 342 and 362, a player uses a cellphone 340 or a computing device 360 to connect to the gameplay system via, for example, a website (or app installed on the cellphone 340). The website 350 would be configured to allow the player to enter identifying and/or security information to access their player profile and the customization preferences stored in the database 330. In these approaches 342, 362, the player typically will be provided access to all editable/selectable customization preferences, which may be sorted in a variety of ways to ease review such as by attraction and/or by interactive experience. This allows for much more detailed customization editing than typically provided with the wearable 310. The customization approaches 342, 362 may be utilized when the player is outside the park (e.g., some time before arriving at the park) or outside a gameplay space where use of the cellphone 340 or computer 360 are convenient (e.g., in a queue to an attraction, while dining, and so on). In these approaches 342, 362, the website 350 is shown at 356 to communicate to or set preferences in the customization backend 356, which, in turn, stores the selected and/or update customization preferences in the database 330 in each player's profile as shown at 324.

Figure 4:
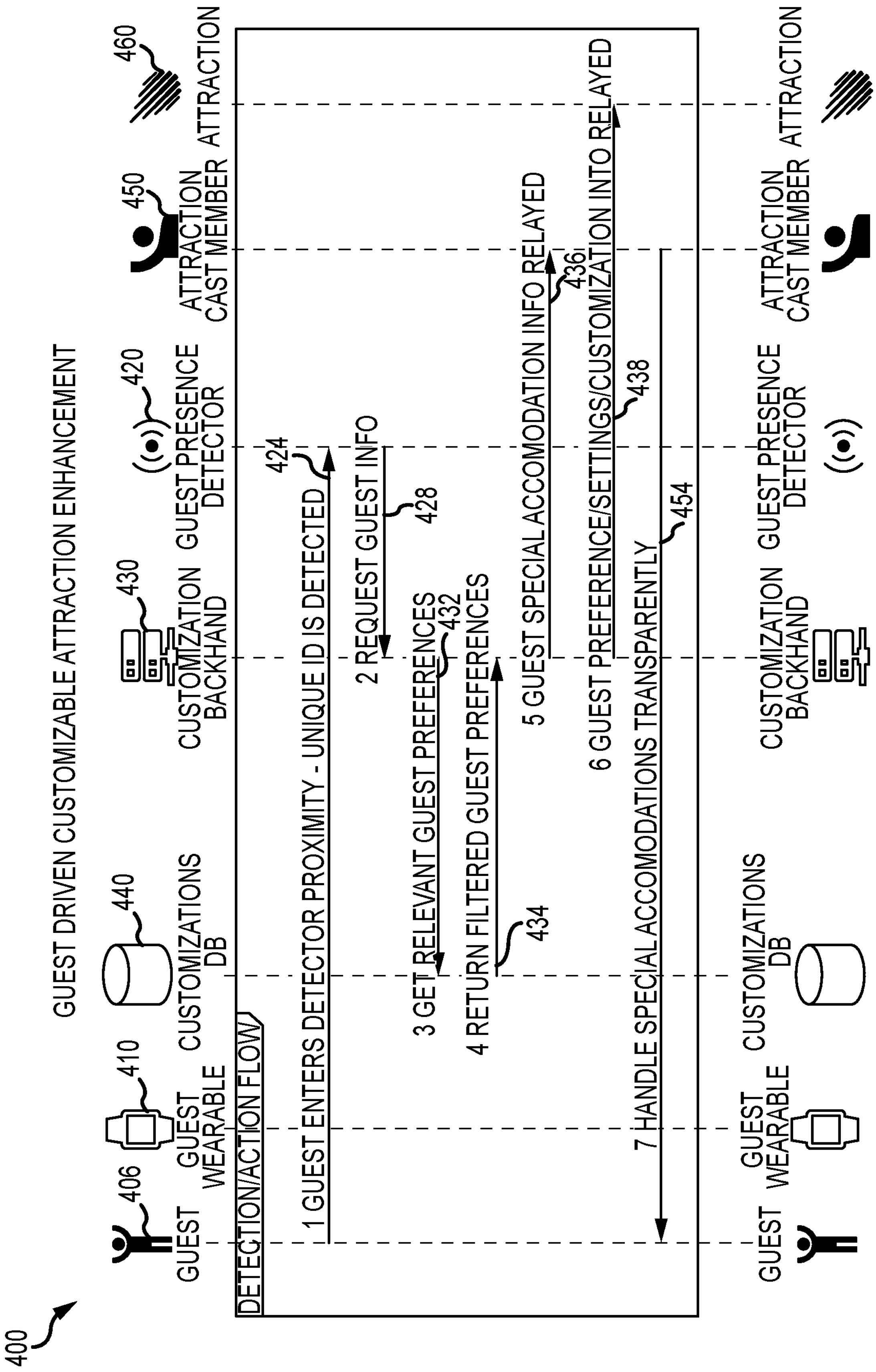
FIG. 4 illustrates a flow diagram showing steps in a process for player or visitor-driven enhancement of a customizable attraction including initial detect steps performed by a gameplay system such as during operation of the system of FIG. 1.

FIG. 4 illustrates a flow diagram showing steps in a process 400 for player or visitor-driven enhancement of a customizable attraction including initial detection steps performed by a gameplay system such as during operation of the system of FIG. 1 when a player approaches an attraction operated in a gameplay system. The gameplay system is shown to include a gameplay device or wearable 410, a guest presence detector 420, a customization backend 430, a customization database 440 with player profiles, an attractions cast member 450, and an attraction 460 configured to provide an interactive experience to park visitors based at least in part on each player's customization preferences, e.g., by generating one or more interactive feature defined or selected based on the customization preferences or enhanced or modified based on the customization preferences.

When a guest or player 406 is within detection range of the gameplay system (such as when they enter an attraction or a gameplay space, the guest presence detector 420 acts to detect or recognize their presence such as with computer vision techniques. The detector 420 then (or initially without detection of the human player 406) may function to detect the presence of the wearable 410 and obtain (via signal processing, via RF interrogation when the wearable 410 includes an RF chip or transceiver, via two-way communications, or other approach) the unique ID assigned to or associated with the wearable or gameplay device 410. These steps are shown with arrow 424 in FIG. 4.

In the method 400, the guest presence detector 420 then triggers as shown with arrow 428 the customization backend 430 (which may be a park-wide system) passing the following information to the backend 430: (a) unique identifier (of device 410 and, typically, player 406); (b) unique identifier of attraction (or gameplay space); (c) current timestamp; and (d) local settings from player's wearable device 410 (e.g., present settings stored in device 410 memory of customization preferences (if any updates, yet provided)). As shown at 432, the customization backend 430 requests data specific to the player 406 and the attraction from the customization database 440 and will update the customizations database 440 with any new data from the wearable device 410 (based on timestamp to determine if new or not). In some cases, the customization preferences from the player profile that are specific to the attraction (or to a gameplay space within the attraction) are communicated by the detector 420 back to the wearable 410 for display in or use in generating a GUI provided on a screen of a display of the wearable 410.

As shown at 434 in FIG. 4, the player and attraction-specific filtered data (i.e., customization preferences) is returned to the backend 430. Note, in some cases, the method 400 may include an attraction (e.g., its detector 420 or a system controller) reading customization information for other attractions, too, and using one or more of these customization preferences to generate the interactive experience along with those displayed to the player in the GUI that are editable and specific to the attraction or its gameplay space. The backend 430 then at 436 acts to relay the customization preferences or those relevant to member or character interactions to an attraction cast member (or to their communication device(s)). For example, if the player 406 has requested or noted in their customization preferences any special accommodations (e.g., a disability, sensory difficulties, language preferences, and so on), these are passed at 436 from the backend 430 to the cast member 450 for use in providing one or more interactive element in a discreet manner (e.g., a cast-viewable screen, an audio cue, or the like).

Further, in the method 400 at 438, the customization backend 430 operates to communicate the specific preferences for the player 406 (along with their unique identifier) to the attraction (or its controller). The attraction (or its controller) uses these player-specific customization preferences to enhance the interactive experience such as by enhancing or modifying or selecting one or more interactive element based on one or more of the customization preferences (e.g., display a particular projectile shooting from the wearable device 410, visually or via audio indicate the player's affinity to one team in a competition, and so on). The preferences for the player 406 may be used immediately by the attraction or its controller or may be stored in local memory for linking or interacting with the player 406 at various parts of the attraction (at differing gameplay spaces) through further detection of the player 406 and/or wearable 410 in the attraction (e.g., a park ride or themed land). When and where appropriate as shown with arrow 454, the cast member or character 450 transparently and efficiently caters to the player's needs as identified in the customization preferences.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The gameplay system and associated methods facilitate significant and real-time customization by participants or players. The gameplay system gives the players more agency during their park visit than they could ever previously experience, which can bring true magic to their day. With regard to attraction and park operators, the gameplay system allows the operators to provide a wealth of different experiences in the same physical locations rather than designing to the lowest common denominator to try to satisfy the majority of visitors. Players with special needs can enjoy attractions and experiences more transparently and more discreetly (e.g., private and/or hidden) than ever before, which helps them to focus on having fun instead of any attraction limitations. The gameplay system keeps visitors coming back to an attraction to try different things to get new experiences. The system lengthens the popularity, life, and possibilities of an attraction by making it a platform for different experiences and not letting it become stale by generating positive buzz around the attraction.

The new gameplay system allows a creative team to put more into an attraction and allows opening new attraction layers as new media gains popularity. The statistical data from player selections of the customization preferences can be leveraged to better understand park visitors and improve future offerings. The players may be able to use the gameplay system to modify the attraction in a non-narrative way, too. For example, a hyper-sensitive player may be able to select reduced ride vehicle motion, reduced lighting, or reduced audio intensity to make the experience more pleasurable to them. A player with a particular type of color blindness may enhance their experience by making choices of colors in the display portion of the interactive experience. The ability to customize an experience drives repeat visits to the same attractions and the interactive experience they generate because the experience can be changed each time.

We claim:

1. A method comprising:

receiving, from a detection device, an identifier for a gameplay device;

retrieving, by a controller, a profile of a user associated with the identifier received from the detection device, the profile storing a plurality of customization preferences;

determining customization preferences from the plurality of customization preferences for the gameplay device based on a detector; and communicating, by the controller to the gameplay device, the determined customization preferences, wherein the determined customization preferences are provided for an interactive experience or a responsive experience using the gameplay device.

2. The method of claim 1, wherein determining the customization preferences is further based upon information regarding an attraction associated with the detection device.

3. The method of claim 1, further comprising:

receiving location information for the gameplay device;

wherein determining the customization preferences is further based upon the location information.

4. The method of claim 1, further comprising:

receiving information to update the plurality of customization preferences; and updating the plurality of customization preferences based on the information, wherein the plurality of customization preferences are updated to enable an adjustment of the interactive experience in real-time or near real-time.

5. The method of claim 4, further comprising:

communicating to the gameplay device, the updated plurality of customization preferences to enable the gameplay device to change from operating in a first manner to operating in a second manner in real-time or near real-time.

6. The method of claim 4, wherein receiving the information to update the plurality of customization preferences comprises at least one of receiving the information from the gameplay device, or receiving the information from a communication device.

7. The method of claim 1, further comprising:

receiving data from the gameplay device;

determining, based on a timestamp of the data, whether the data is new data; and responsive of the determination that the data is new data, updating the plurality of customization preferences.

8. The method of claim 1, further comprising communicating, by the controller, the determined customization preferences to a communication device associated with a second user different than the user.

9. A system comprising:

a wearable having an identifier and configured to be worn or carried by a participant;

a first detection device configured to detect the wearable and obtain the identifier; and a controller in communication with the first detection device and the wearable, the controller configured to:

receive the identifier from the first detection device;

retrieve a profile of the participant associated with the identifier received from the first detection device; and retrieve, from the profile, customization preferences from a plurality of customization preferences based on a detector, wherein the customization preferences are provided to the wearable to provide an interactive experience to the participant.

10. The system of claim 9, wherein the system is an augmented reality system.

11. The system of claim 9, wherein:

the interactive experience is a first interactive experience and the customization preferences are first interactive experience customization preferences; and the controller is configured to;

obtain the identifier from a second detection device; and provide second interactive experience customization preferences to configure the wearable for a second interactive experience.

12. The system of claim 11, wherein the first interactive experience is for a first attraction associated with the first detection device and the second interactive experience is for a second attraction associated with the second detection device.

13. The system of claim 9, wherein:

the identifier is a first identifier;

the controller is configured to:

receive the first identifier and a second identifier regarding an attraction, and retrieve one or more of the plurality of customization preferences based on the first identifier or the second identifier; and the first detection device is to provide the one or more of the plurality of customization preferences to the wearable.

14. The system of claim 9, further comprising a data storage to store the plurality of customization preferences, wherein the controller is further to:

receive data from the wearable, and update the plurality of customization preferences stored by the data storage.

15. The system of claim 14, wherein the plurality of customization preferences is updated based on a determination that the data is new data, the determination based on a timestamp of the data.

16. A system comprising:

a wearable having an identifier and configured to be worn or carried by a participant; and a controller configured to:

receive the identifier from a device;

retrieve a profile of the participant associated with the identifier received from the device; and retrieve, from the profile, customization preferences, wherein at least a portion of the customization preferences are provided to the wearable to provide an interactive experience to the participant, and wherein the portion of the customization preferences includes information regarding at least one of an amount of motion during the interactive experience, a volume of audio during the interactive experience, or colors displayed during the interactive experience.

17. A method comprising:

retrieving a profile of a participant using an identifier obtained from a device, the identifier associated with a wearable of the participant;

retrieving, from the profile, customization preferences from a plurality of customization preferences based on a detector, the plurality of customization preferences associated with the identifier obtained from the device; and providing the customization preferences for an interactive experience via the wearable.

18. The method of claim 17, further comprising:

providing the customization preferences to configure the wearable for the interactive experience provided by a first attraction and for another interactive experience provided by a second attraction.

19. The method of claim 17, wherein the customization preferences are used in a first attraction and second customization preferences from the plurality of customization preferences are used in a second attraction.

20. The method of claim 17, wherein retrieving the profile of the participant comprises:

outputting a pattern of light from the wearable; and receiving, by the device, the pattern of light to determine the identifier, the identifier linked to the profile of the participant.

* * * * *